(12) United States Patent
Chen

(10) Patent No.: US 12,643,341 B2
(45) Date of Patent: Jun. 2, 2026

(54) SPOKE REINFORCING METHOD AND REINFORCED STRUCTURE OF SPOKES

(71) Applicant: HEXA CO., LTD., Taipei City (TW)

(72) Inventor: James Chen, Taipei City (TW)

(73) Assignee: SHA-DAR ACCESSORIES CO., LTD., New Taipei City (TW)

( * ) Notice: Subject to any disclaimer, the term of this patent is extended or adjusted under 35 U.S.C. 154(b) by 577 days.

(21) Appl. No.: 18/157,840

(22) Filed: Jan. 22, 2023

(65) Prior Publication Data

US 2024/0246357 A1 Jul. 25, 2024

(51) Int. Cl.
*B60B 1/02* (2006.01)

(52) U.S. Cl.
CPC .................................. *B60B 1/0246* (2013.01)

(58) Field of Classification Search
CPC ....... B60B 1/0246; B60B 1/00; B60B 1/0261; Y10T 29/53996; Y10T 29/49622; Y10T 29/49506; B21J 9/02; B21J 9/022; B21D 7/02; B21D 7/022
USPC ................................ 29/894.33, 283.5, 897.2
See application file for complete search history.

(56) References Cited

U.S. PATENT DOCUMENTS

| | | | |
|---|---|---|---|
| 6,189,978 B1 * | 2/2001 | Lacombe | ................ B60B 1/041 301/58 |
| 7,344,259 B2 * | 3/2008 | Zabrakes | .................. B60B 1/00 359/523 |
| 2004/0139609 A1 * | 7/2004 | Meggiolan | ............ B60B 1/0215 29/894.3 |
| 2009/0050276 A1 * | 2/2009 | Lacombe | .............. B60B 1/0269 157/3 |

FOREIGN PATENT DOCUMENTS

WO    WO-2009133303 A2 * 11/2009  ........... B60B 21/064

OTHER PUBLICATIONS

English Machine Translation of WO 2009/133303 (Year: 2009).*

* cited by examiner

*Primary Examiner* — Sarang Afzali
*Assistant Examiner* — Darrell C Ford
(74) *Attorney, Agent, or Firm* — Alexander Chen, Esq.

(57) ABSTRACT
A spoke reinforcing method includes straightening and cutting a drawn spoke; stamping one end of the spoke using a first stamping unit to form an initial head and an initial neck; clamping the initial head, the initial neck, and a main body of the spoke in a clamping die to forge a reinforced part; stamping the spoke while retained in the clamping die using a second stamping unit to form a final head, a final neck, and a final reinforced part; and hobbing an opposite end to form a threaded portion. In embodiments, the reinforced part has a polygonal cross-section, including a hexagonal or rectangular cross-section.

5 Claims, 16 Drawing Sheets

(A)                                        (B)

(A)

(B)

(A)

(B)

7

(B)

(A)

(A)

(B)

SPOKE REINFORCING METHOD AND REINFORCED STRUCTURE OF SPOKES

BACKGROUND OF INVENTION

1. Field of the Invention

The present invention relates generally to a spoke reinforcing method and manufacturing spokes with a reinforced structure, and more particularly to a spoke reinforcing method and reinforced structure of spokes which can enhance the compressive strength and flexural strength, reduce the fracture probability, and prolong the lifetime of spokes.

2. Description of Related Art

As shown in FIG. 1, a conventional spoke (6) has a main body of spoke, with a head (61) and a thread part (62) disposed at respective ends of the main body of the spoke, and a curved neck (63) is formed at the joint of the head (61) and the main body of spoke. Because neck fractures often occurred in conventional spokes, suppliers made improvements and developed an improved spoke (7), as shown in FIG. 2. In addition to the head (71), thread part (72) and neck (73) of the basic structure of the spoke, they proposed a forging process to forge the neck (73) of the main body of spoke at least twice, so as to remedy the frequent neck (63) fractures of conventional spoke (6). This improved spoke performed successfully in tensile tests and fatigue tests, and the laboratory data were satisfactory. However, unexplained fractures occasionally occurred in practice. The ruptures were almost all in the spokes on the non-driving side (N) of the rear wheel. This is a serious defect, and the fractured spoke could seize the wheel, which may injure the rider. However, it is abnormal that the spokes on the non-driving side (N) fracture first, so it is a low-tension end (low-stress end). According to experience, the spokes on the driving side (D) receiving high tension, high pull and high torque are expected to fracture first in practice, as shown in FIG. 3. The "tensile test" and "anti-fatigue test" were performed repeatedly throughout the years. This kind of reinforced spokes still resulted in good data, and the fracture could not be explained.

Although the improved spoke (7) showed good laboratory data, fractures continued to occur in practice. The analysis results indicated the laboratory testing method had blind spots. In the tensile test (FIG. 4) and fatigue test (FIG. 5) for the conventional improved spoke (7), the stress was applied vertically. However, the wheelset not only receives vertical force, but also receives lateral force during wheel assembly and in practical use. Moreover, the spoke is located between the hub and rim, and there is also a tilt angle. In order to obtain more accurate experimental data, the test method was modified. The assembly method for the wheel with different angles on both sides is simulated. Different hubs are provided with different wheel diameters, a 4° to 10° bevel angle is generated between the improved spoke and hub (about 4° on the rear wheel driving side of a 26″ bicycle, about 10° on non-driving side). The tensile tester and fatigue tester are changed from standard vertical angle to tilt angle for retest. In the novel tensile test, the test results of "tilt angle" and "standard vertical angle" are compared, and there is a slight variation in the tensile figure of the improved spoke. The tensile figure is reduced only by 1% to 2% when the improved spoke has a 10° tilt angle (FIG. 6). However, in the novel fatigue test, the test results of "tilt angle" and "standard vertical angle" are compared (FIG. 7). There is significant variation in the lifetime of spokes. The spoke with a tilt angle is more likely to fracture. When the spoke has a 10° tilt angle, the fatigue test shows the lifetime is shortened by almost 50%. It is obvious that this improved spoke processing method may be favorable for the low-speed but high-load vehicle type (the spokes of this process have high tensile figure), but there is a high fracture risk for high-speed vehicle type (the spokes of this process are adverse to high-frequency vibration fatigue). Without improvement, the improved spokes produced by this processing method would continue to cause accidents.

To further investigate this problem, according to the running tests and fatigue tests, the breaking points of the conventional improved spoke mostly occur within 3 mm normally under the forging reinforced area. However, after the wheelset is assembled and the improved spoke has normal tension, the shape of conventional improved spoke is observed, there is bending due to stress (direction of stress changed) at 1~5 mm normally under the forging reinforced area. This bending point due to stress is exactly the position where the bending stress is concentrated, as well as the breaking point (B) in the fatigue test result (FIG. 8). This breaking point (B) shows that the neck of the conventional improved spoke is reinforced by forge processing, the work hardening keeps its shape (approximating steel body), the direction of lower stress is changed on the contrary, the lateral force results in deformation, and the fatigue hot zone/fracture hot zone is formed in high-frequency vibration. This fatigue hot zone/fracture hot zone is resulted from inconsistent metal density and grain boundary interface with faults and excessive difference in the juncture of forging reinforced area and non-forged area of the improved spoke (FIG. 9), so that the bending stress is concentrated in the non-forged area with lower metal density, and the anti-fatigue lifetime is shortened.

In view of this, the inventor sought a solution. With years of expertise and experience in manufacturing spokes, and through continuous experiments, trials and improvements, the spoke reinforcing method and reinforced structure of spokes of the present invention were developed, so as to enhance industrial competitiveness and added value.

SUMMARY OF THE INVENTION

The objective of the present invention is to provide a spoke reinforcing method and reinforced structure of spokes. An improved structure is provided to address deficiencies in conventional spokes and reinforced improved spokes. In a fracture-prone region of a conventional or improved spoke, a hexagonal columnar reinforced section is forged according to a defined procedure to replace the original cylindrical structure. This configuration provides improved compressive strength and flexural strength, and the fracture probability of the fracture-prone region is reduced, thereby prolonging spoke lifetime.

In order to achieve the above purpose, the present invention provides a spoke reinforcing method, including the following steps: straightening and cutoff, wherein the drawn, unprocessed spoke is straightened and cut to the required length; first forging, wherein one end of the spoke is stamped by a first stamping unit to form the initial head and neck; clamp forming, wherein the head, neck, and main body of the initial formed spoke are clamped by a clamping die, the reinforced part is forged during clamping; second forging, wherein the spoke fixed by the same clamping die is stamped by a second stamping unit, to form a reinforced structure of spokes with a head, a neck, and a reinforced part; hobbing, the end opposite to the head of the spoke is hobbed to form the thread part.

In an embodiment, a bending step may be performed between the second forging and hobbing steps to bend the neck of the formed spoke.

A reinforced structure of spokes is manufactured according to the spoke reinforcing method, wherein the spoke includes a main body of spoke, and a head, a neck, and a reinforced part are disposed in turn from the edge of one end of the main body of spoke, and the other end is provided with a thread part.

In an embodiment, the length of the reinforced part of the reinforced structure of spokes is at least 5 mm.

In an embodiment, the cross-sectional shape of the reinforced part is polygonal.

In an embodiment, the cross-sectional shape of the reinforced part is hexagonal.

In an embodiment, the cross-sectional shape of the reinforced part is rectangular.

In an embodiment, the spoke forms include straight-pull spokes and elbow spokes.

BRIEF DESCRIPTION OF THE DRAWINGS

FIG. 1 is the outside view of a conventional spoke.

FIG. 2 is the outside view of a conventional reinforced spoke.

FIG. 3 is the schematic diagram of conventional improved spokes installed on wheel.

FIG. 4 is the schematic diagram of tensile test for conventional improved spoke.

FIG. 5 is the schematic diagram of fatigue test for conventional improved spoke.

FIG. 6 is the schematic diagram of tensile test for conventional improved spoke with improved tilt angle.

FIG. 7 is the schematic diagram of fatigue test for conventional improved spoke with improved tilt angle.

FIG. 8 is the schematic diagram of rupture of conventional improved spoke.

FIG. 9 is the schematic diagram of grain density of conventional improved spoke.

FIG. 10 is the outside view from different viewing angles of the reinforced structure of spokes of the present invention.

FIG. 11 (A) to (B) show the flow charts of the present invention for different spokes.

FIG. 12 (A) to (B) are the actual process diagrams I and II of the spoke reinforcing method for different spokes of the present invention.

FIG. 13 is the implementation application illustration of the spoke reinforcing method of the present invention.

FIG. 14 is the schematic diagram of grain density of the reinforced structure of spokes of the present invention.

FIG. 15 shows the fatigue test results of the reinforced structure of spokes of the present invention, conventional spoke and conventional improved spoke at different tilt angles.

DETAILED DESCRIPTION OF THE INVENTION

Figure 1:
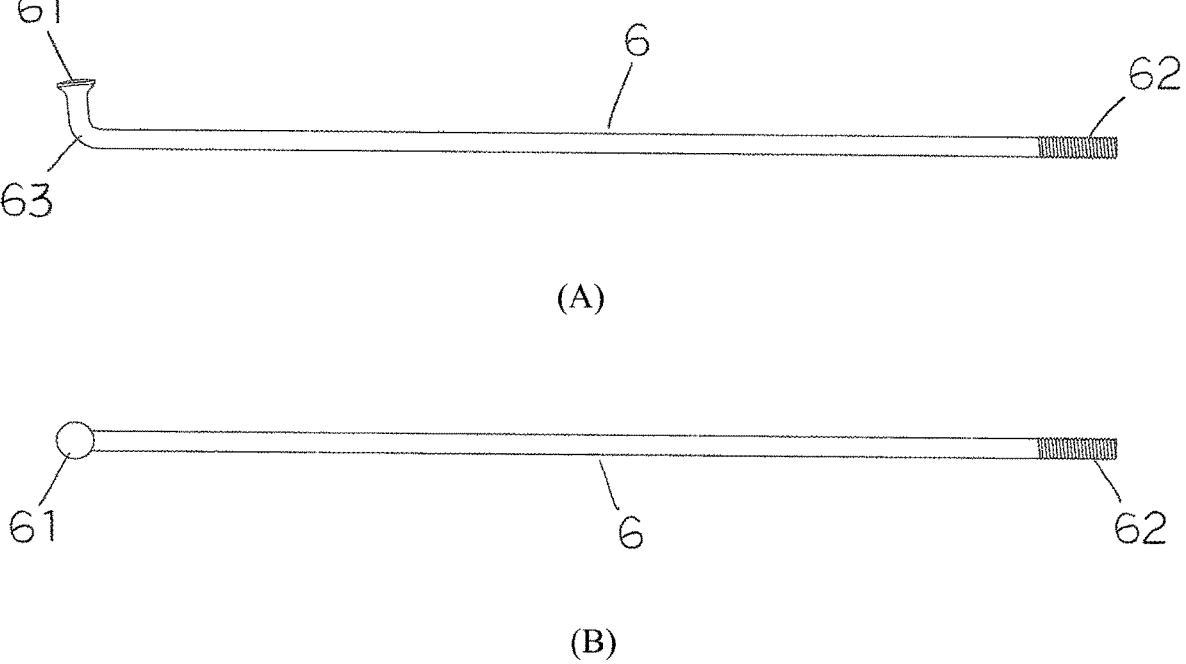
FIGS. 1-9 illustrate prior art spokes and test arrangements.
Figure 2:
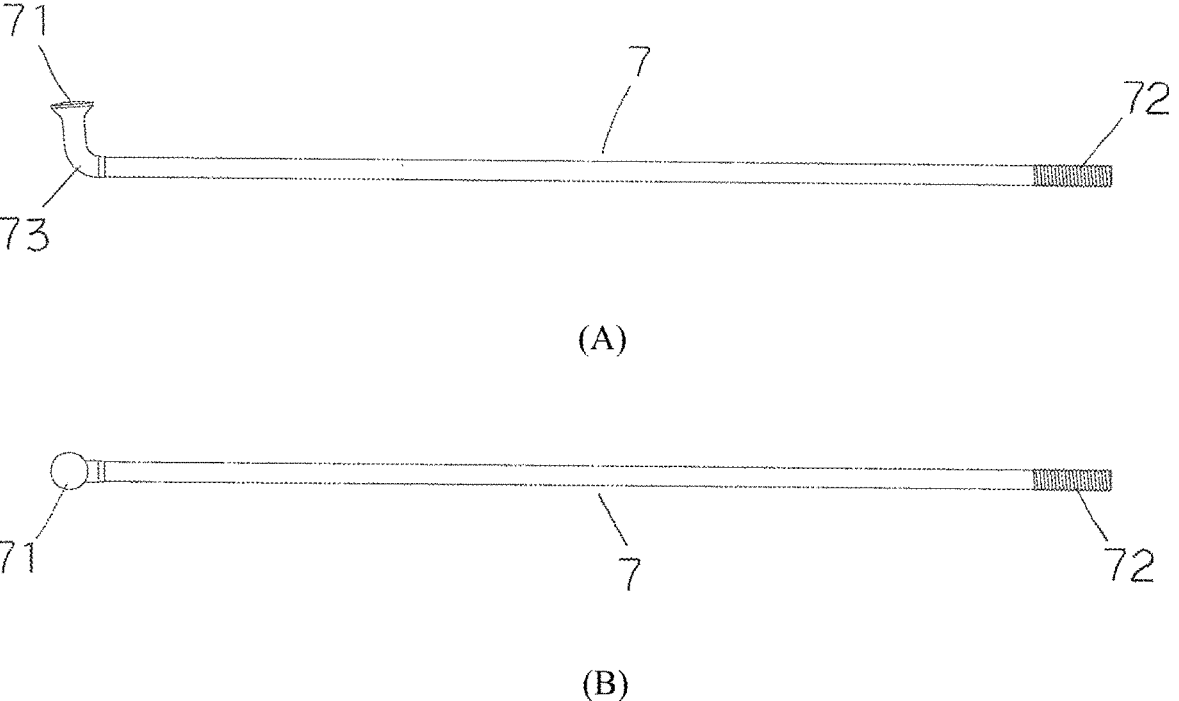
Figure 3:
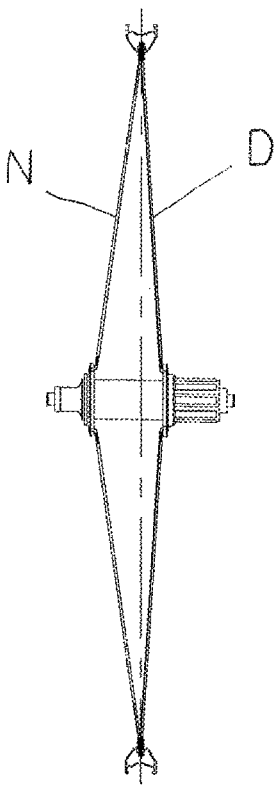
Figure 4:
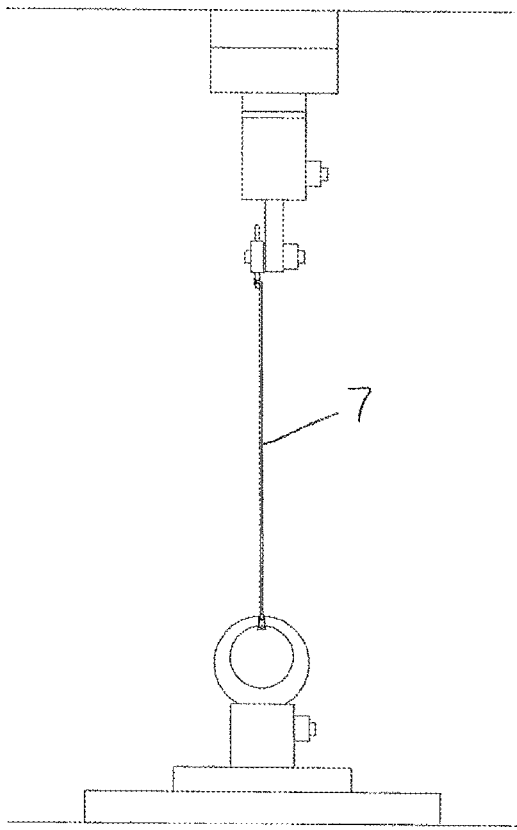
Figure 5:
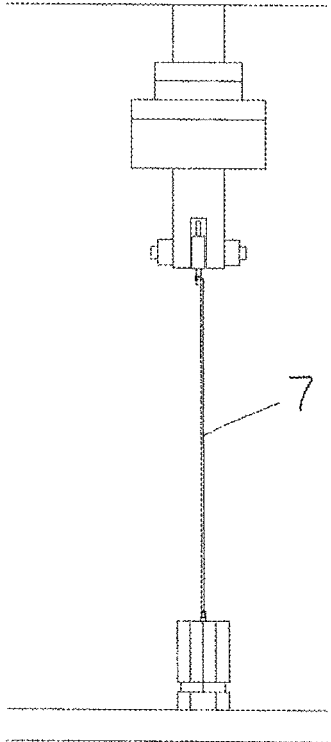
Figure 6:
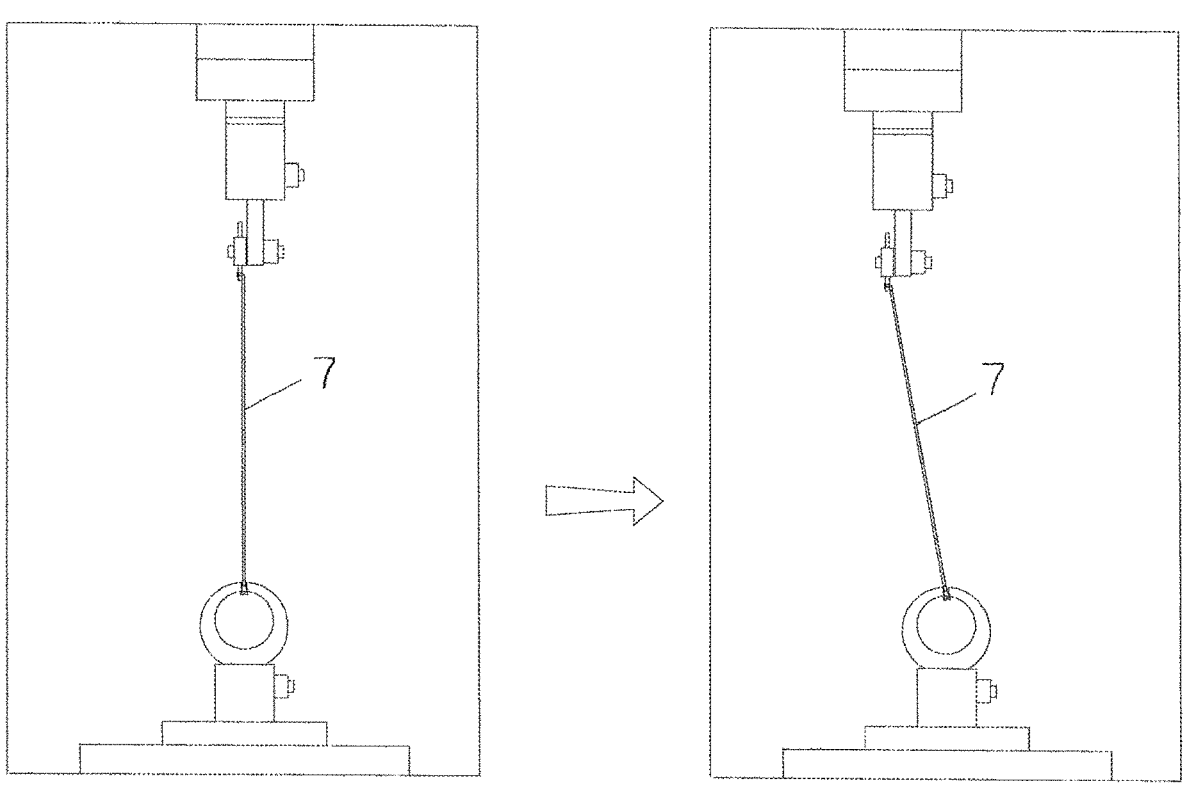
Figure 7:
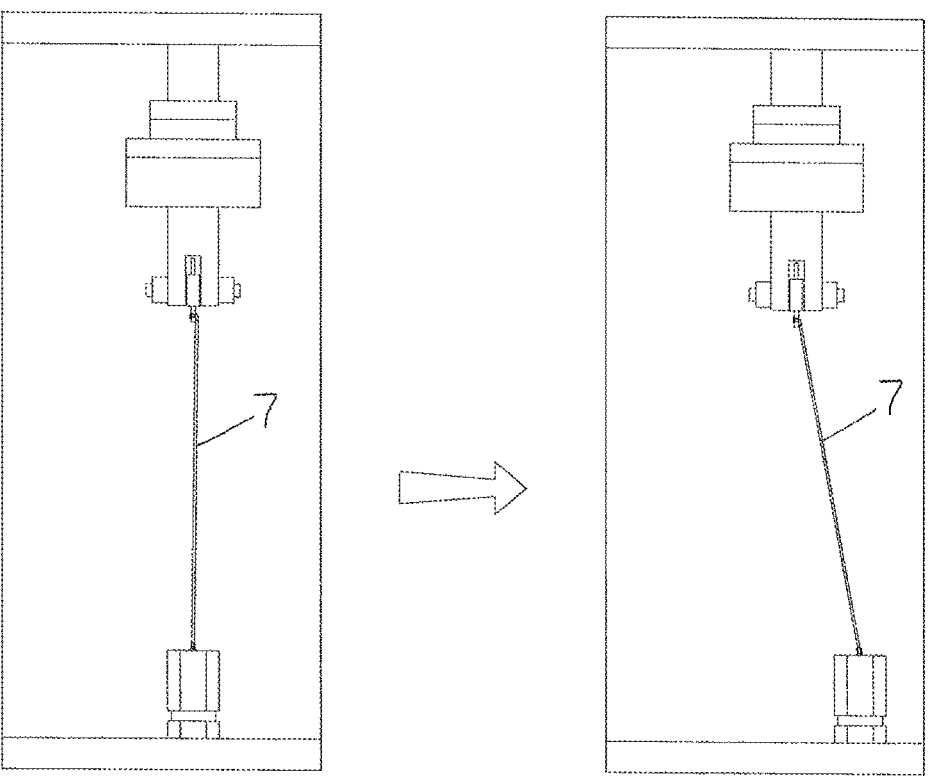
Figure 8:
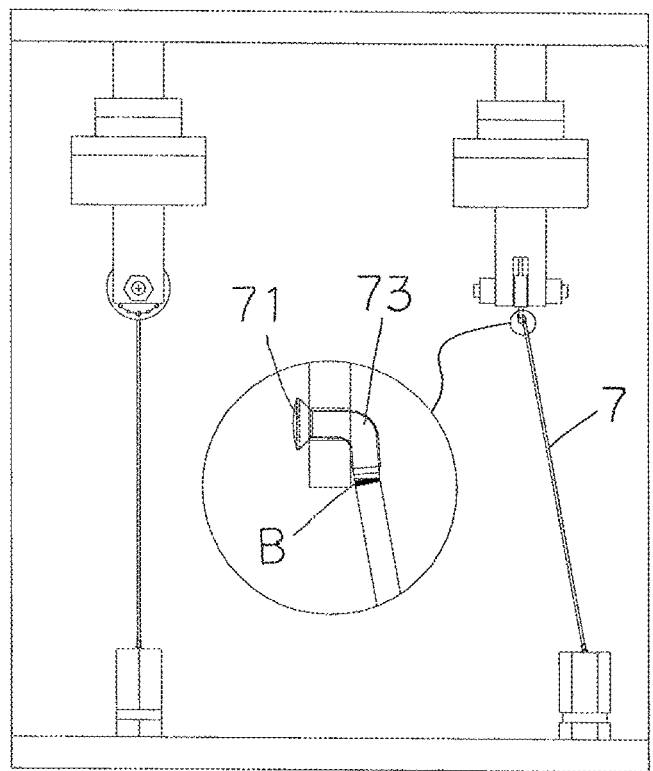
Figure 9:
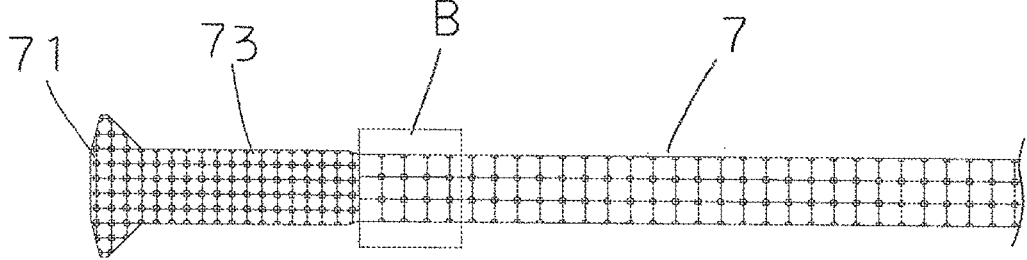
Figure 10:
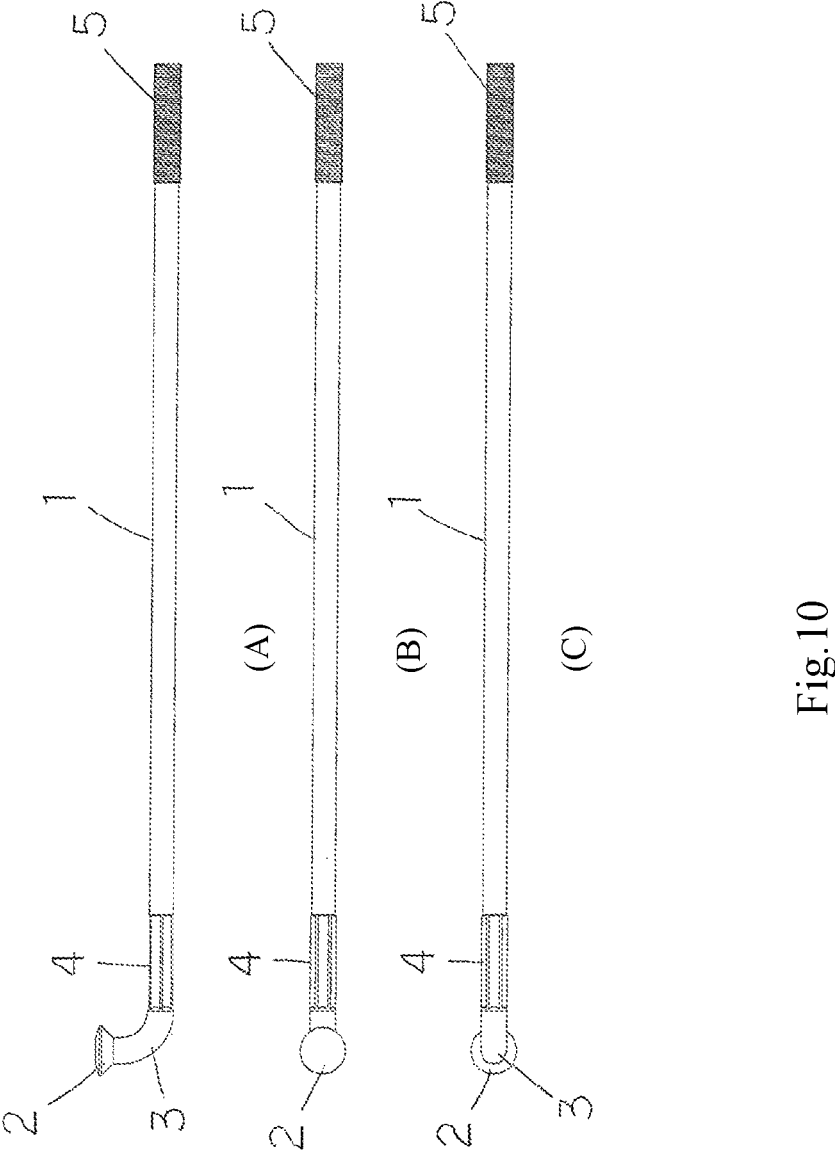
FIGS. 10-15 illustrate embodiments and results of the present invention.
Figure 11:
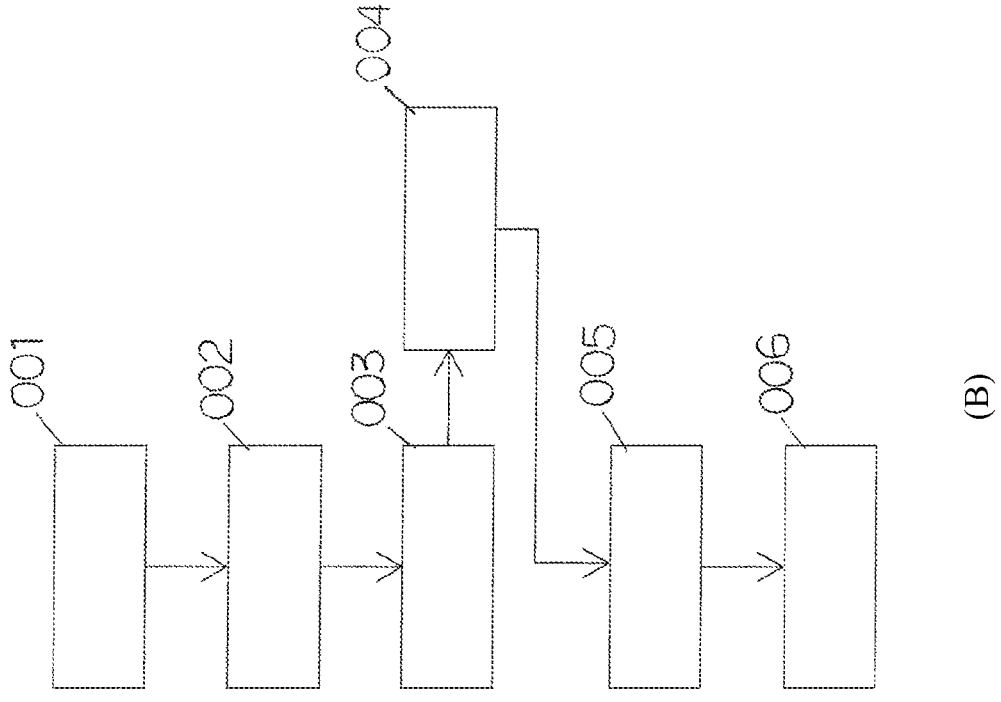
Figure 11:
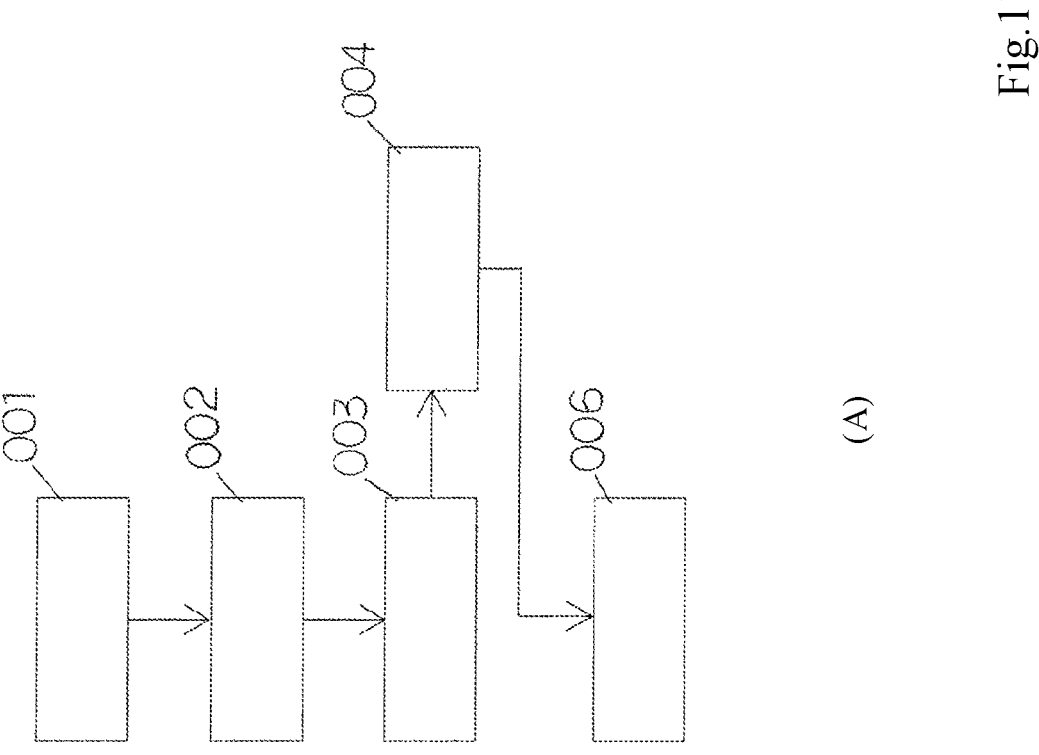
Figure 12:
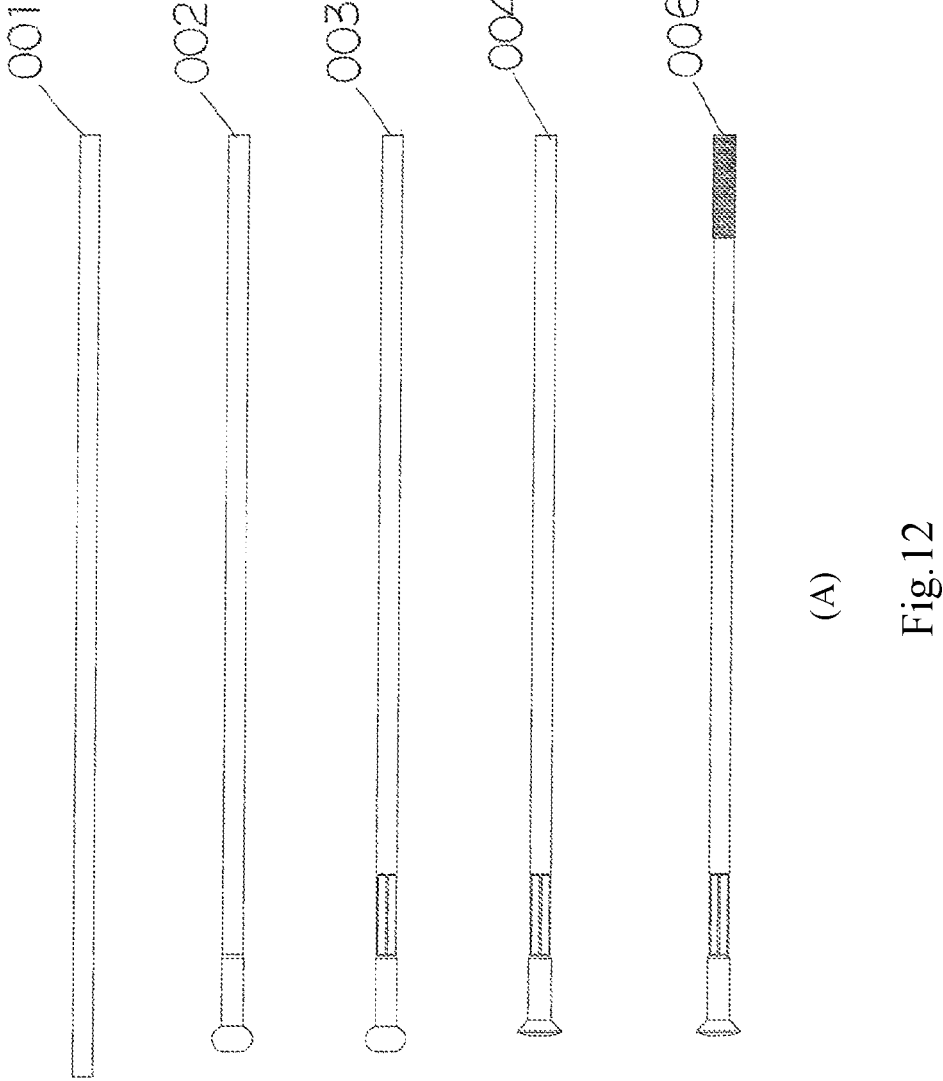
Figure 12:
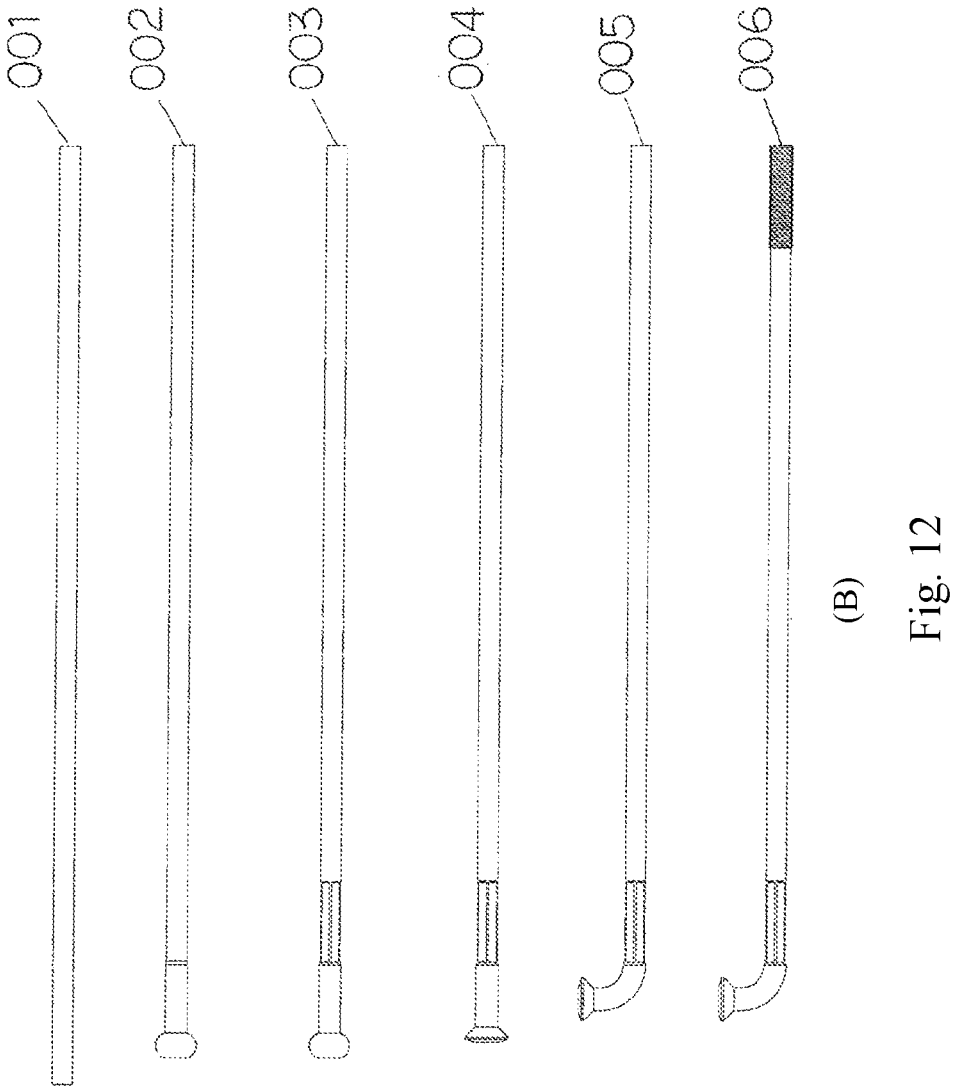
Figure 13:
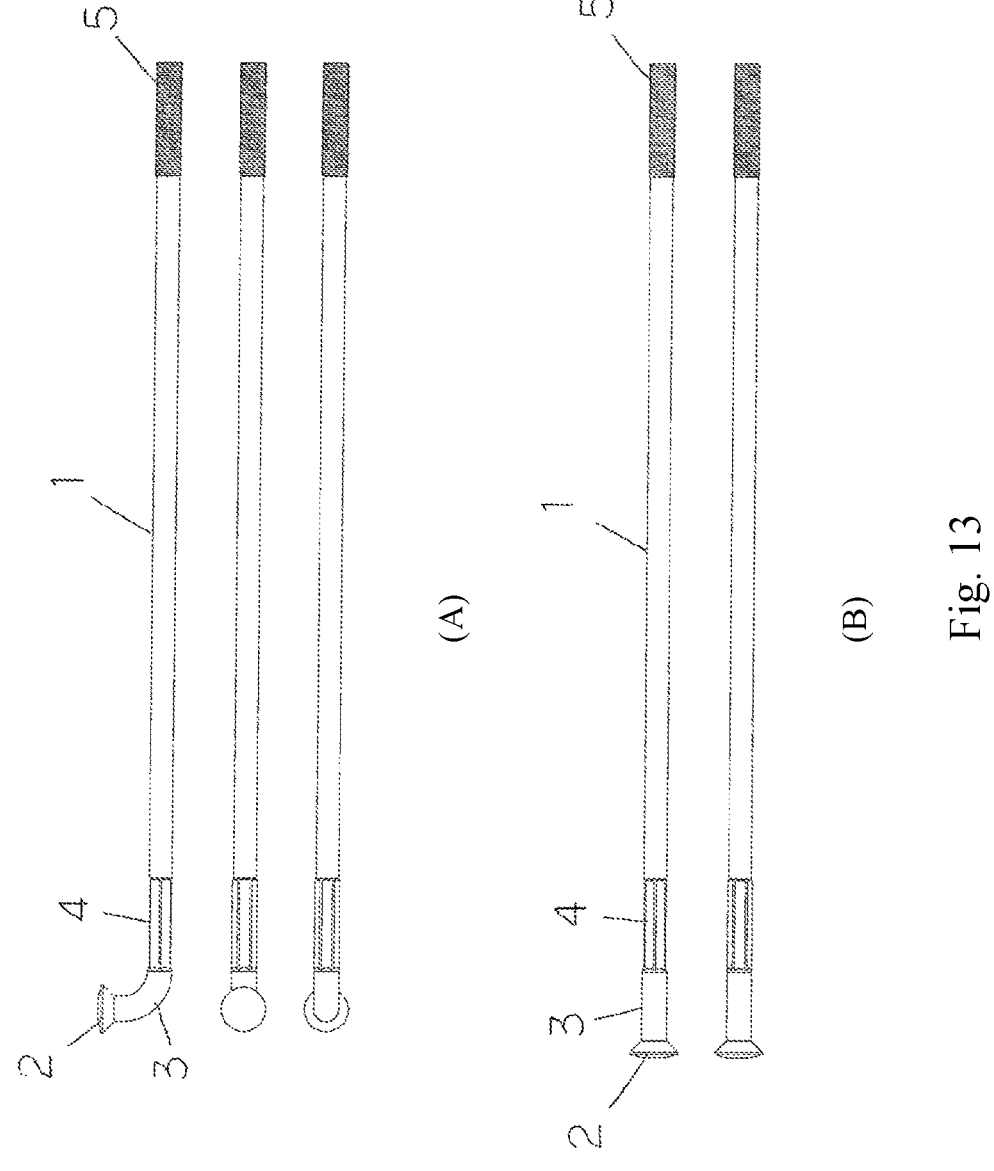

FIGS. 10 to 14 disclose the spoke reinforcing method in a preferred embodiment of the present invention. First, a metal material is drawn into an elbow spoke of the required diameter. The metal material includes, but is not limited to stainless steel, carbon steel, titanium alloy, aluminum alloy, etc. The spoke production methods include straight-pull spokes and elbow spokes, taking the elbow spoke production method as an example, as shown in FIG. 11 (B), the procedure includes straightening and cutoff (001), wherein the drawn spoke (1) is straightened and cut to the required length; first forging (002), wherein one end of the spoke (1) is stamped by a first stamping unit to form the initial head (2) and neck (3); clamp forming (003), wherein the head (2), neck (3), and main body of spoke (1) of the initial formed spoke (1) are clamped by a clamping die, forging of the reinforced part (4) is completed during clamping, a hexagonal column is taken as an example in this embodiment (including, but is not limited to triangular prism, quadrangular prism or arbitrary polygonal column); second forging (004), wherein the spoke (1) clamped by the clamping die is stamped by a second stamping unit, to form the final head (2), neck (3), and reinforced part (4); bending (005), wherein the neck (3) of the formed spoke (1) is bent; hobbing (006), wherein the end opposite to the head (2) of said spoke (1) is hobbed to form a thread part (5), thus the reinforced structure of spokes is completed, as shown in FIG. 10.

The straight-pull spoke production method is shown in FIG. 11 (A). The procedure omits the bending (005) process, and includes straightening and cutoff (001), first forging (002), clamp forming (003), second forging (004) and hobbing (006).

Figure 14:
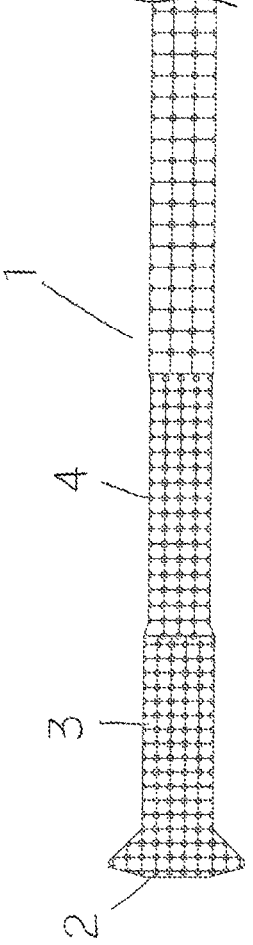

The clamp forming (003) in the reinforced spoke manufacturing method includes the second forging (004) process. It is noteworthy that the neck (3) and reinforced part (4) of the spoke (1) must be forged in the same clamping die, to ensure the grain density of the processed head (2), neck (3), and reinforced part (4) of the spoke (1) is continuous and free of discontinuities, as shown in FIG. 14.

As shown in FIG. 10, the reinforced structure of spokes manufactured according to the spoke reinforcing method includes a main body of spoke (1). A head (2), a neck (3), and a reinforced part (4) are arranged in turn from one end of the main body of the spoke (1), and the other end is provided with a thread part (5). Particularly, the cross-sectional shape of the reinforced part (4) is hexagonal, rectangular, or polygonal; and it has been experimentally demonstrated that improved compressive strength and flexural strength can be achieved while using a reduced amount of material.

Figure 15:
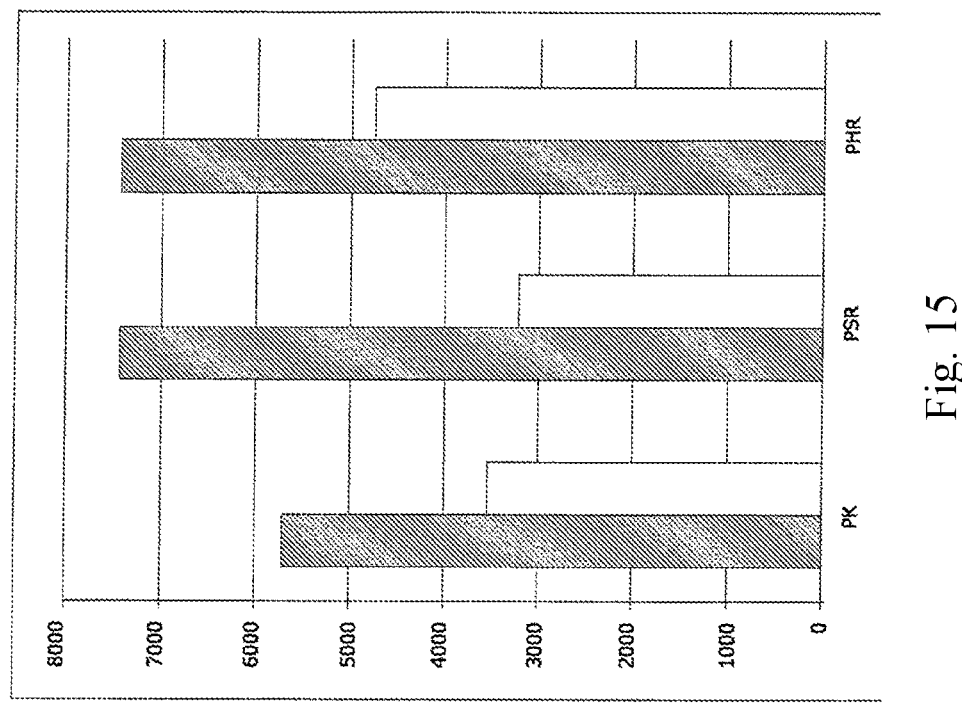

FIG. 15 discloses the fatigue test results of the spoke of the present invention, a conventional spoke and a conventional improved spoke. The left axis represents fatigue test cycles. PK represents the conventional spoke; PSR represents the improved spoke; and PHR represents the reinforced structure of spokes of the present invention. For each histogram, the left bar corresponds to 0° (standard vertical fatigue test), and the right bar corresponds to 10° (tilt angle fatigue test). Under the same test conditions, the same raw material, the same production equipment, the same test equipment and the same fixture are used to perform a fatigue test (180 Kgf, 10 Hz) for the conventional spoke, improved spoke and reinforced structure of spokes. The chart shows that the reinforced structure of spokes of the present invention exhibits better performance than the conventional spoke and the conventional improved spoke at both 0° and 10°. The experimental data indicate that the spoke strength can be improved after the fragile part of the conventional improved spoke is improved into a hexagonal columnar reinforced part structure type according to the described processing procedure.

According to the above description, the spoke reinforcing method of the present invention includes forging a reinforced part (hexagonal columnar or rectangular) connected to the forged neck, because the area 1 to 3 mm below the neck thickened by multiple forging operations will become the fatigue/fracture hot zone. This reinforced part thereby replaces the unforged cylindrical spoke at the conventional joint. The reinforced part in this shape provides compressive strength and flexural strength, to buffer the high-frequency lateral stress on the joint below the neck having higher grain density, and to reduce the repeated fracture incidents. As a result, the spoke fracture probability is reduced, and the spoke lifetime is prolonged.

Although the invention has been explained in relation to its preferred embodiment, it is to be understood that many other possible modifications and variations can be made without departing from the spirit and scope of the invention as hereinafter claimed.

The invention claimed is:

1. A spoke reinforcing method, including the following steps:

a straightening and cutoff step) providing a drawn spoke, straightening the drawn spoke, and cutting the drawn spoke, producing a straightened and cutoff spoke;

a first forging step) stamping one end of the straightened and cutoff spoke using a first stamping unit to form an initial head and an initial neck, producing an initial formed spoke;

a clamp forming step) clamping the initial head, initial neck, and a main body of the initial formed spoke using a clamping die, producing a reinforced part of the spoke by forging during the clamping;

a second forging step) stamping, using a second stamping unit, the spoke after the clamp forming step using the same clamping die, so as to form a final head, final neck, and final reinforced part;

a hobbing step) hobbing an end opposite the final head of said spoke to form a thread part.

2. The spoke reinforcing method of claim 1, further comprising, after the second forging step and before the hobbing step, bending the final neck.

3. The spoke reinforcing method of claim 1, wherein the final reinforced part has a polygonal cross-sectional shape.

4. The spoke reinforcing method of claim 3, wherein the polygonal cross-sectional shape is hexagonal or rectangular.

5. The spoke reinforcing method of claim 1, wherein a length of the final reinforced part is at least 5 mm.

* * * * *